(12) United States Patent  
Lin

(10) Patent No.: US 9,594,995 B1  
(45) Date of Patent: Mar. 14, 2017

(54) MAGNETIC CARD

(71) Applicant: SMARTDISPLAYER TECHNOLOGY CO., LTD., Keelung (TW)

(72) Inventor: Lee Chung Lin, Keelung (TW)

(73) Assignee: SMARTDISPLAYER TECHNOLOGY CO., LTD., Keelung (TW)

( * ) Notice: Subject to any disclaimer, the term of this patent is extended or adjusted under 35 U.S.C. 154(b) by 0 days.

(21) Appl. No.: 15/005,982

(22) Filed: Jan. 25, 2016

(51) Int. Cl.  
*G06K 7/08* (2006.01)  
*G06K 19/06* (2006.01)

(52) U.S. Cl.  
CPC .............. *G06K 19/06187* (2013.01)

(58) Field of Classification Search  
USPC ................................... 235/449, 493  
See application file for complete search history.

(56) References Cited

U.S. PATENT DOCUMENTS

| | | | | |
|---|---|---|---|---|
| 3,218,615 A | * | 11/1965 | Reimer ................. | G11C 17/02 365/135 |
| 5,181,149 A | * | 1/1993 | Katsumata ............ | G11B 5/105 360/119.07 |
| 2003/0231020 A1 | * | 12/2003 | Yonezawa ............. | H01Q 1/52 324/326 |
| 2007/0149901 A1 | * | 6/2007 | Gordon ................. | A61N 2/004 601/15 |
| 2007/0285255 A1 | * | 12/2007 | Tsushima ............. | G06K 7/0008 340/572.7 |
| 2010/0264211 A1 | * | 10/2010 | Jain ...................... | G06F 1/1698 235/380 |
| 2014/0049983 A1 | * | 2/2014 | Nichol ................. | G02B 6/0018 362/610 |

* cited by examiner

*Primary Examiner* — Tuyen K Vo  
(74) *Attorney, Agent, or Firm* — Rabin & Berdo, P.C.

(57) ABSTRACT

A magnetic card internally includes a magnetic field generator, which includes a flexible substrate having pads, wires and a core material member arranged thereon. The pads are arrayed to form a first and a second zone. Every wire is extended in a first direction to connect to two pads that are separately located in the first and the second zone. The core material member is extended in a second direction oblique to the first direction. The substrate is in a bent state with the pads in the first zone correspondingly connected to the pads in the second zone and the core material member located in an encircling space defined by the connected pads and the wires. By changing the current amount supplied thereto, the magnetic field generator can generate variable magnetic field magnitude, enabling the magnetic card to change the transmitted data according to actual need in use.

10 Claims, 8 Drawing Sheets

MAGNETIC CARD

FIELD OF THE INVENTION

The present invention relates to a card that transmits data via magnetic induction, and more particularly, to a magnetic card that has variable magnetic field magnitude to enable change of data transmission.

BACKGROUND OF THE INVENTION

In the present human society that is driven by digital information, various types of personal information are digitalized in electronic products for transmission, transfer and recording. Through the use of cards, communication of information is more convenient. Card types that are widely used in people's daily life include cardholder's proprietary cards, such as debit cards, credit cards and the like issued by banks; prepaid cards that are equivalent to securities; and identity cards such as driver's license, health insurance card, passport and the like.

Most of the proprietary cards and security-equivalent cards are provided on a back side with a magnetic stripe, into which required information is written. And, information magnetically stored in the stripe can be read with an automatic card reader, such as an automatic teller's machine, or other manual card readers for performing subsequent procedures.

To stop easy production of counterfeit cards that cause cardholders' loss in property, a design of forming a magnetic field generator inside the cards for changing the magnetic field magnitude of the magnetic cards has been developed. Please refer to FIGS. 1 and 2. A first conventional magnetic field generator 1 provided in magnetic cards includes a substrate material 10, on a surface thereof a plurality of bonding pads 11, a plurality of connection pads 12, a plurality of bonding wires 13 and a core material member 14 are arranged. The bonding pads 11 are arrayed on the surface of the substrate material 10 in rows and columns. The connection pads 12 are respectively connected at an end to a first bonding pad 11 and at another end to a second bonding pad 11 that is located at a column the same as the first bonding pad 11 but at a row different from the first bonding pad 11 and is therefore closest to the first bonding pad 11. The bonding wires 13 are bonded at two opposite ends to two of the bonding pads 11 that are located at two different rows and columns, such that the bonding wires 13 are extended in a direction oblique to the connection pads 12 to be arc-shaped each. The core material member 14 is arranged between the connection pads 12 and the bonding wires 13.

To form the first conventional magnetic field generator 1, the bonding wires 13 must be precisely bonded to connect at respective two ends to two boding pads 11 that are located at different rows and columns. Therefore, equipment with relatively high precision for bonding wires is required in the manufacturing process. In addition, the bonding wires 13 are subject to a certain probability of breaking in subsequent fabrication procedures. That is, the first conventional magnetic field generator 1 needs improvement in terms of its manufacturing cost and yield rate.

FIG. 3 shows a second conventional magnetic field generator 2 provided in magnetic cards. The second conventional magnetic field generator 2 includes a first substrate material 20, a plurality of first bonding pads 21, a plurality of first connection pads 22, a second substrate material 23, a plurality of second bonding pads 24, a plurality of second connection pads 25, a plurality of connection material members 26, and two core material members 27. The first bonding pads 21 are arranged on a surface of the first substrate material 20, and the first connection pads 22 are respectively connected at two opposite ends to between two of the first bonding pads 21. The second boding pads 24 are arranged on a surface of the second substrate material 23, and the second connection pads 25 are respectively connected at two opposite ends to between two of the second bonding pads 24. And, each of the first bonding pads 21 on the first substrate material 20 is connected to one second bonding pad 24, which is located on the second substrate material 20 at a position corresponding to the first bonding pad 21, via a connection material member 26.

The second conventional magnetic field generator 2 formed of the mutually connected first substrate material 20 and second substrate material 23 is improved compared to the first conventional magnetic field generator 1, because electrical circuits are formed on the magnetic field generator 2 in a different manner to overcome the problem of easily breaking bonding wires. However, since the two substrate materials are independently fabricated, more manufacturing procedures are needed and material cost is largely increased.

SUMMARY OF THE INVENTION

A primary object of the present invention is to provide a magnetic card, inside which a magnetic field generator is included. By changing the amount of current supplied thereto, the magnetic field generator can produce variable magnetic field magnitude, so that data in the magnetic card to be transmitted via magnetic induction can be changed according to actual need in use.

Another object of the present invention is to provide a magnetic card that internally includes a magnetic field generator having a simplified structure, so that the magnetic card can be fabricated with largely shortened and easier procedures to effectively reduce the manufacturing cost and largely increase the yield rate thereof.

To achieve the above and other objects, the magnetic card provided according to the present invention internally includes a magnetic field generator capable of producing variable magnetic field magnitude. The magnetic field generator includes a substrate, a plurality of pads, at least one wire, and at least one core material member.

The substrate is made of a flexible material. The pads are arranged on the substrate and arrayed in a first zone and a second zone, which are spaced from each other. The at least one wire is also arranged on the substrate to extend in a first direction to connect at two opposite ends to two pads that are separately located in the first and the second zone. The at least one core material member is extended in a second direction, which is oblique to the first direction.

The substrate is flexed to a bent state, such that the pads in the first zone and the pads in the second zone are connected to one another in one-to-one correspondence and the at least one core material member is located in an encircling space defined by the connected pads and the wires. And, a bent part of each of the wires is extended in a third direction that is different from the first direction.

According to a preferred embodiment of the present invention, the pads in the first zone are in direct contact with the corresponding pads in the second zone, and the pads and the wires together form a coil structure.

According to another embodiment of the present invention, the magnetic field generator further includes a conductive material member provided between each pair of correspondingly connected pads in the first and the second zone. And, the pads, the wires and the conductive material members together form a coil structure.

According to the present invention, the wires respectively have a solder mask layer formed on a surface thereof to avoid direct contact of the core material member with the wires. The magnetic field generator can further include at least one adhesive material provided between the solder mask layers and the core material member to adhere the core material member to the wires. Alternatively, the magnetic field generator can further include at least one adhesive material provided between the core material member and the wires to adhere the core material member to the wires while spacing them from one another. According to the present invention, the magnetic field generator can further include at least one insulating material provided between the core material member and the wires to space them from one another.

In conclusion, the present invention is characterized in that the pads in the first zone and the pads in the second zone are connected to one another in one-to-one correspondence and the wires are brought to locate around the core material member after the flexible substrate is bent to a U-shaped configuration, enabling the wires and the pads to together form a coil structure for current to flow therethrough. With this arrangement, the conventional wire bonding process can be omitted and the circuit pattern for forming the coil structure can be completed with only one fabrication process that requires only relatively low precision. Therefore, the magnetic card of the present invention can be produced at reduced manufacturing cost and largely increased yield rate.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
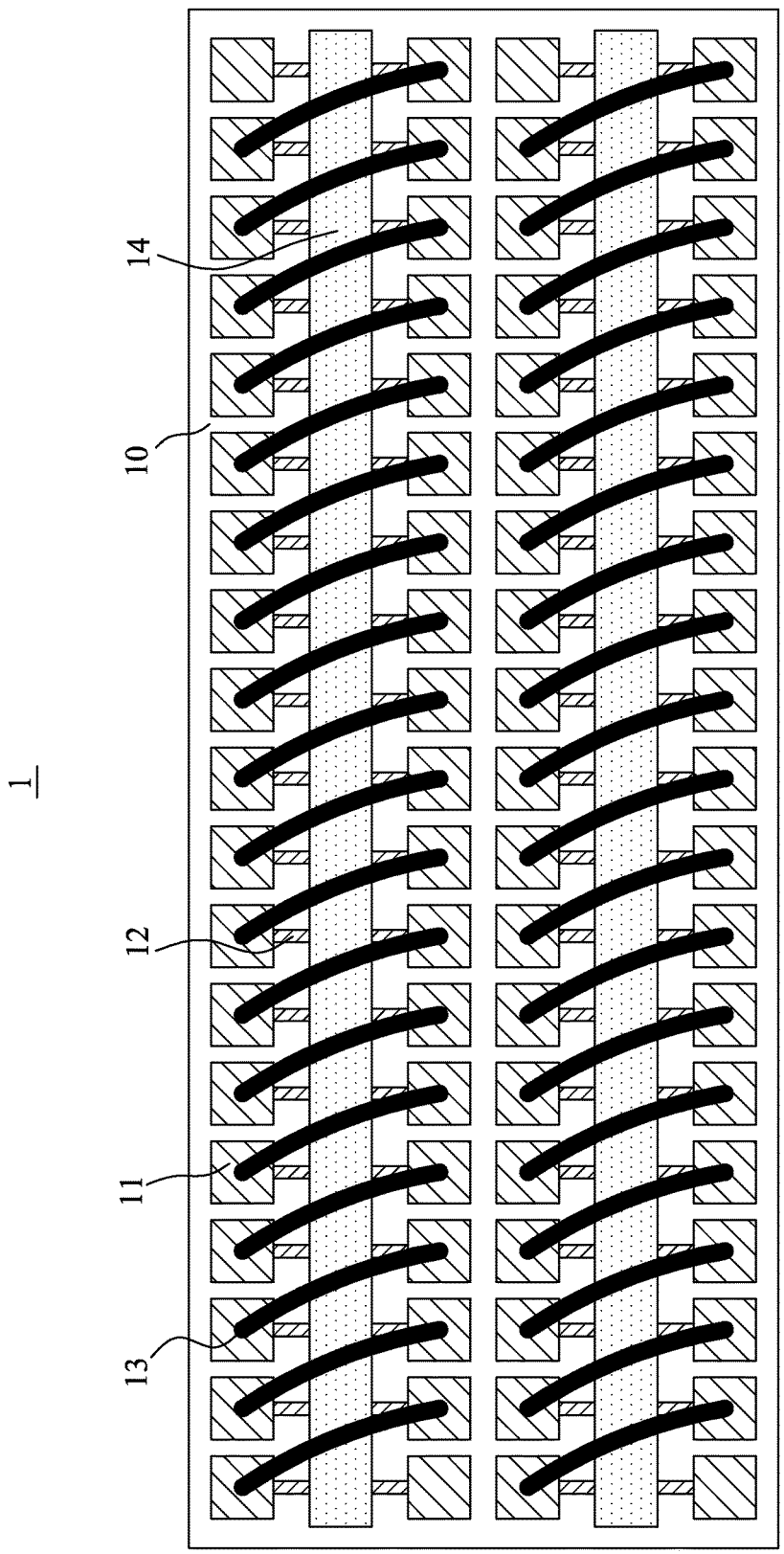
FIG. 1 is a plan view showing a first conventional magnetic field generator inside a magnetic card.
Figure 2:
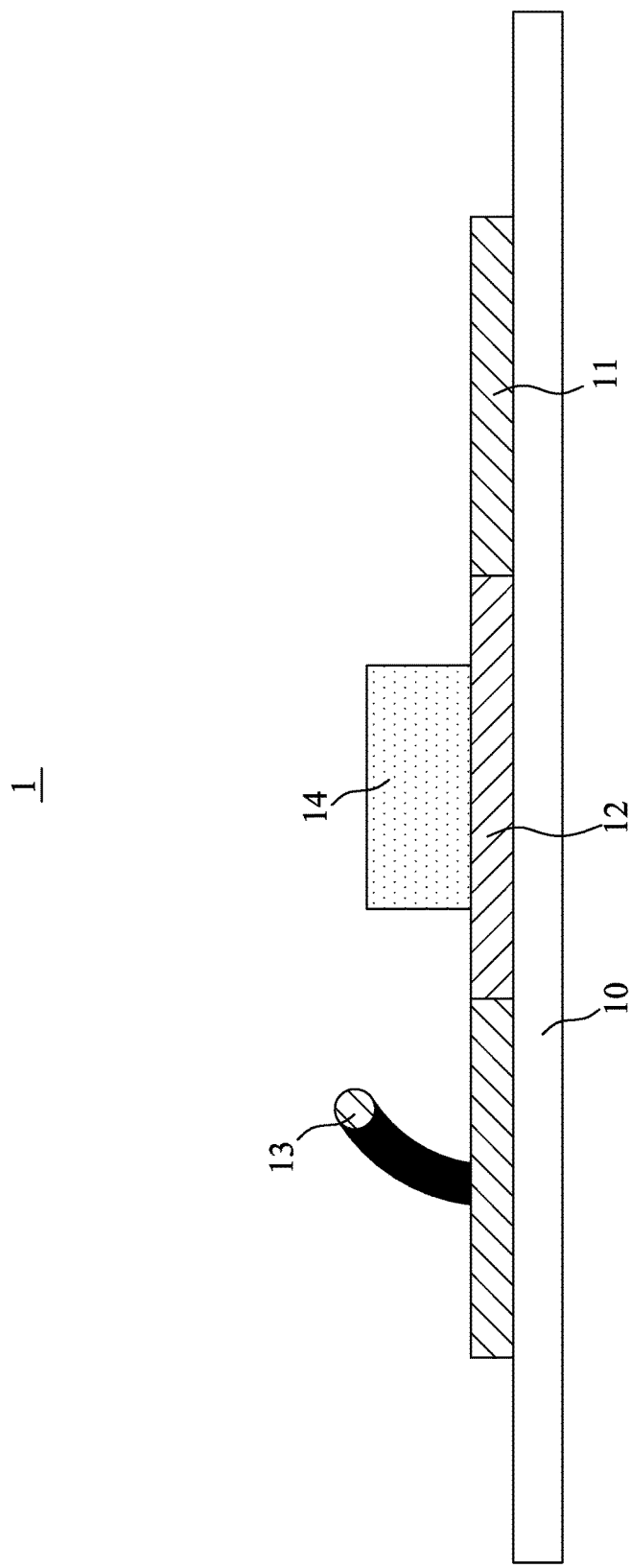
FIG. 2 is a sectional view of the magnetic field generator of FIG. 1.
Figure 3:
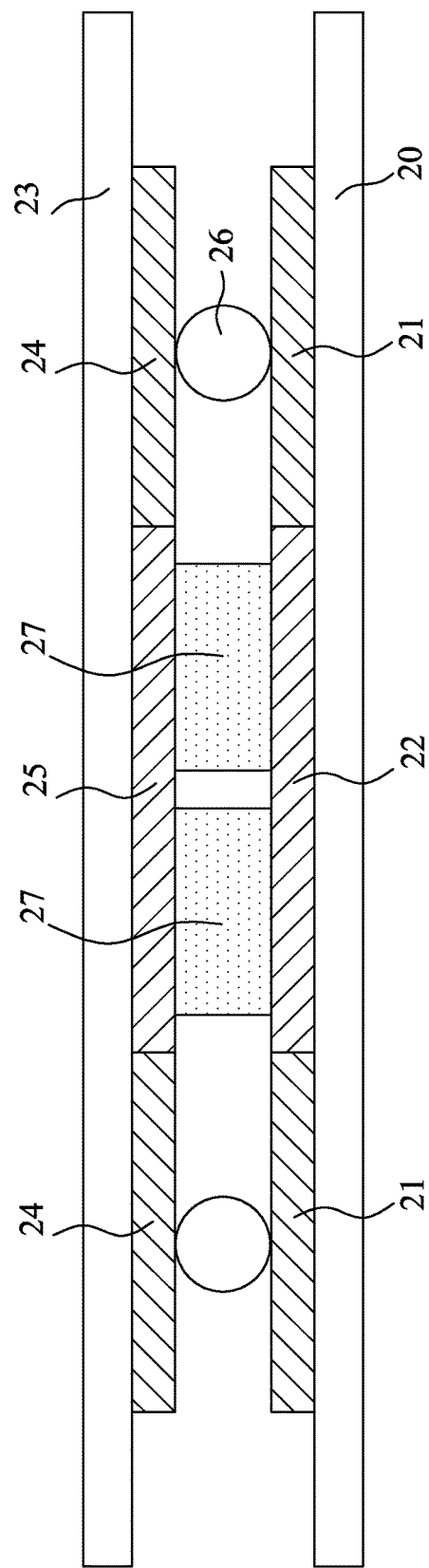
FIG. 3 is a sectional view of a second conventional magnetic field generator inside a magnetic card.

The present invention will now be described with some preferred embodiments thereof and by referring to the accompanying drawings. For the purpose of easy to understand, elements that are the same in the preferred embodiments are denoted by the same reference numerals.

Figure 4:
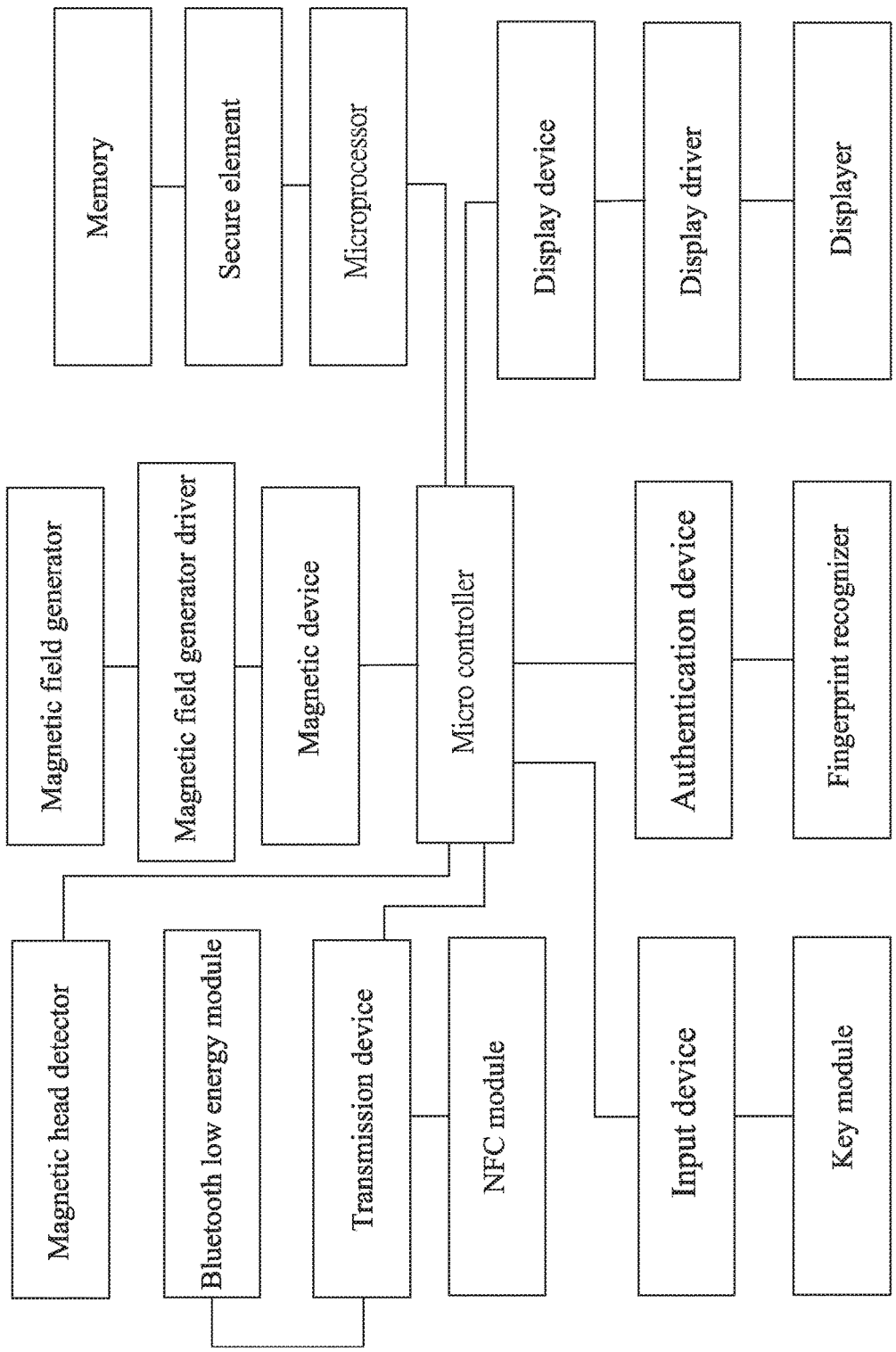
FIG. 4 is a block diagram showing internal modules, including a magnetic field generator, of a magnetic card according to the present invention.

Please refer to FIG. 4. A magnetic card according to the present invention internally includes a microcontroller, a display device for showing related information and/or data, a magnetic device capable of changing the magnetic card's magnetic field magnitude, an input device for a cardholder to operate, a secure element for financial transaction access authentication, an authentication device for identifying a cardholder, and a transmission device for exchanging data messages with an external device.

In a preferred embodiment of the magnetic card according to the present invention, as shown in FIG. 4, the display device includes a displayer located on a surface of the magnetic card and a display driver electrically connected to between the displayer and the microcontroller.

The magnetic device includes a magnetic field generator 3 and a magnetic field generator driver electrically connected to between the magnetic field generator 3 and the microcontroller.

The input device includes a key module for a user to touch and press. The key module can be, for example, a keypad electrically connected to the microcontroller. It is understood, however, the keypad is only illustrative. In other operable embodiments, the input device may be associated with the displayer to provide a touch panel, or be a voice input device to enable sound-controlled operations.

The secure element includes a microprocessor for computing financial transaction data and a memory. The microprocessor is electrically connected to the microcontroller while the memory is electrically connected to the microprocessor.

The authentication device includes a fingerprint recognizer, in which a cardholder's fingerprint data is stored. When using the magnetic card of the present invention, the user must input a fingerprint data into the fingerprint recognizer for a subsequent mutual authentication of the input fingerprint and the stored cardholder's fingerprint data. In the case the two fingerprint data match each other, a message is sent from the microcontroller to the microprocessor for the microprocessor to activate the secure element, so that the user can change the information stored in the card or use the card as a medium to execute a next input instruction by inputting a corresponding card password, an amount to be transferred or the like. On the other hand, in the case the two fingerprint data do not match each other, the microprocessor will not activate the secure element to avoid any unauthorized change of information in the card or any loss of the cardholder in personal information and property.

However, it is understood the above-mentioned fingerprint recognizer is only illustrative. In other operable embodiments of the present invention, the authentication device can be otherwise a validator used with the input device. By inputting at the input device a data such as a number, a word, a pattern or a sound for validation, the validator will check whether the input data matches the authentication data stored in the card, so as to similarly achieve the purpose of validating the user as the cardholder.

The transmission device includes a magnetic head detector electrically connected to the microcontroller, a near field communication (NFC) module electrically connected to the microcontroller, and a Bluetooth low energy module also electrically connected to the microcontroller.

When a user touches the key module on the magnetic card, a touch sensor module detects the touch movement and transmits a message to the microcontroller. At this point, the microcontroller correspondingly transmits the information instructed by the user to the magnetic field generator 3, the Bluetooth low energy module, the NFC module, or the displayer. Meanwhile, the magnetic field generated by the magnetic field generator 3 when being driven by the magnetic field generator driver can also directly send data to a magnetic stripe reader. In this way, the magnetic field generator 3 can enable digital data transmission to a magnetic stripe reader having a message reading head.

Figure 5:
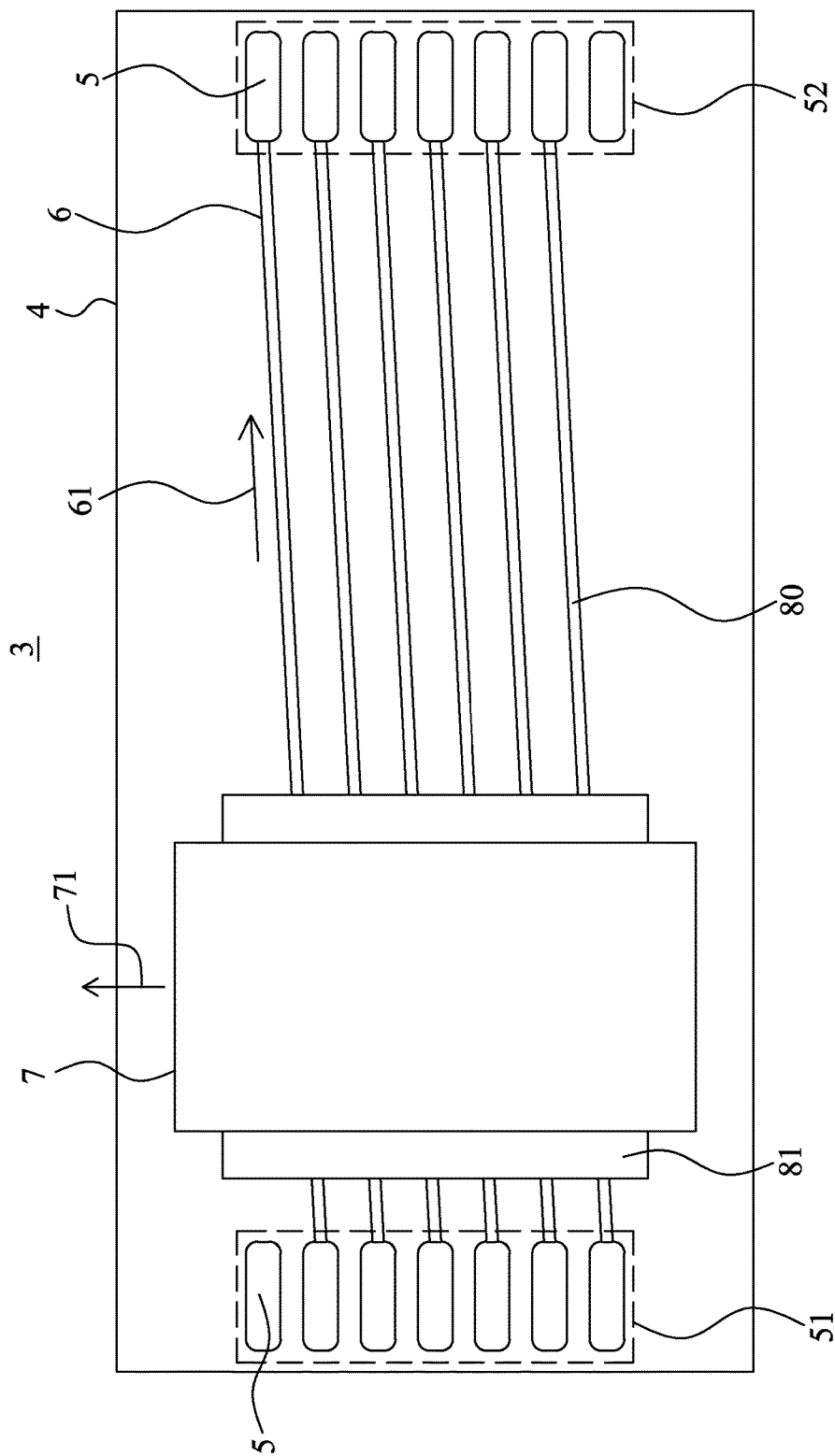
FIG. 5 is a plan view of the magnetic field generator for the magnetic card of the present invention, shown in an unfolded state.

FIG. 5 is a plan view of the magnetic field generator 3 for the magnetic card of the present invention, showing the magnetic field generator 3 in an unfolded state. As shown, the magnetic field generator 3 includes four major parts, namely, a substrate 4, a plurality of pads 5, a plurality of wires 6, and a core material member 7.

The substrate 4 is formed of a flexible material and is first formed into a flat member in the fabrication process. The aforesaid pads 5 and wires 6 all are arranged on one of two surfaces of the substrate 4.

The pads 5 are arrayed in rows and columns to form a first zone 51 and a second zone 52, which are spaced from one another on the substrate 4, and each of the first and second zones includes one column and multiple rows of pads 5. However, it is understood the number of zones as well as the number of columns and rows of pads in each of the two zones shown in FIG. 5 are only illustrative. In other operable embodiments, a third zone and a correspondingly spaced fourth zone (not shown) of the pads 5 can be further formed. Alternatively, more spaced zones of the pads 5 may be formed in pairs.

The wires 6 are extended in parallel with one another. Each of the wires 6 is connected at an end to one of the pads 5 in the first zone 51 and then extends in a first direction 61 to connect at another end to another pad 5 that is located in the second zone 52 at a row different from that of the aforesaid pad 5 in the first zone 51.

In addition, the core material member 7 is located above the wires 6 to extend in a second direction 71, which is oblique to the first direction 61. In the embodiment illustrated in FIG. 5, the second direction 71 is in parallel with a direction, in which the pads 5 are arrayed in columns. Therefore, the wires 6 respectively obliquely intersect with the core material member 7.

Figure 6:
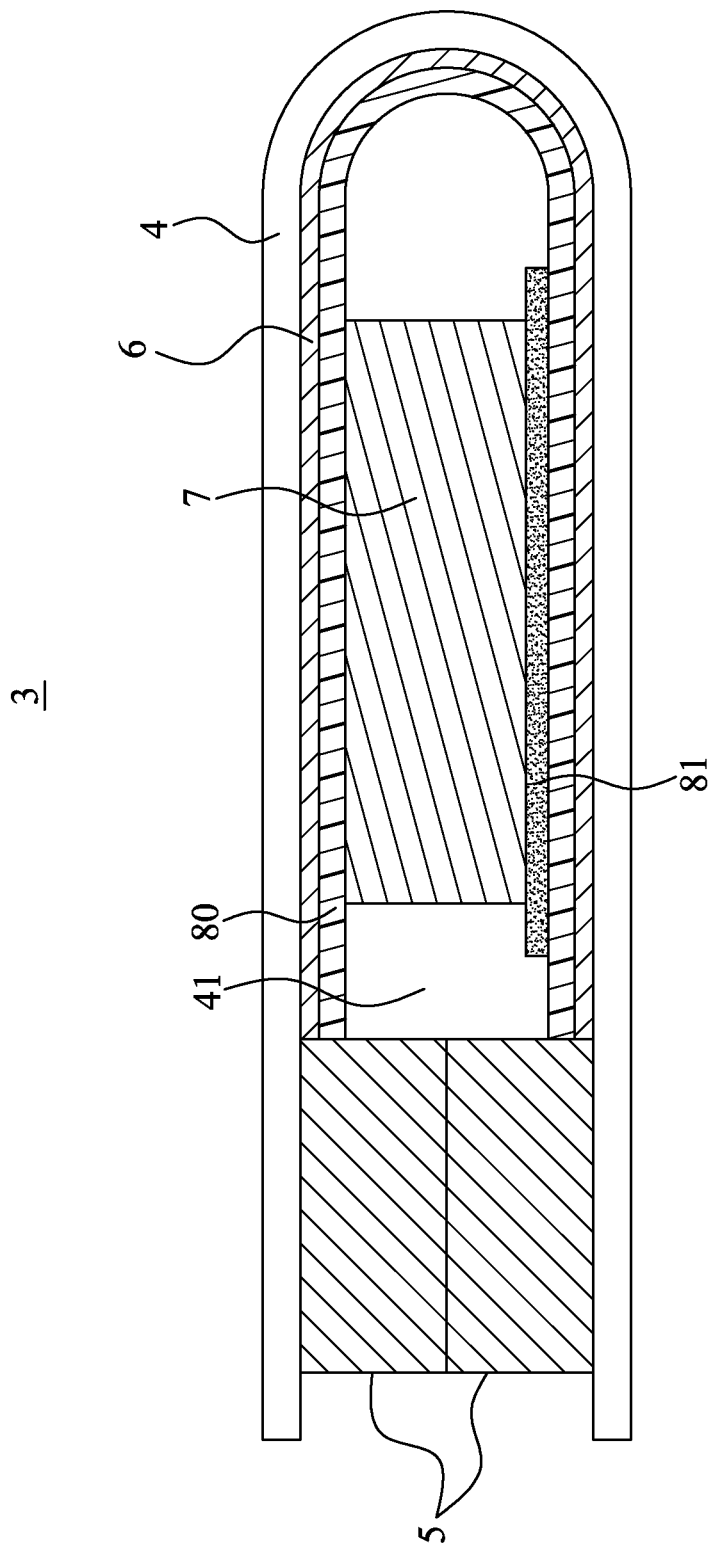
FIG. 6 is a sectional view of a first embodiment of the magnetic field generator for the magnetic card of the present invention.
Figure 7:
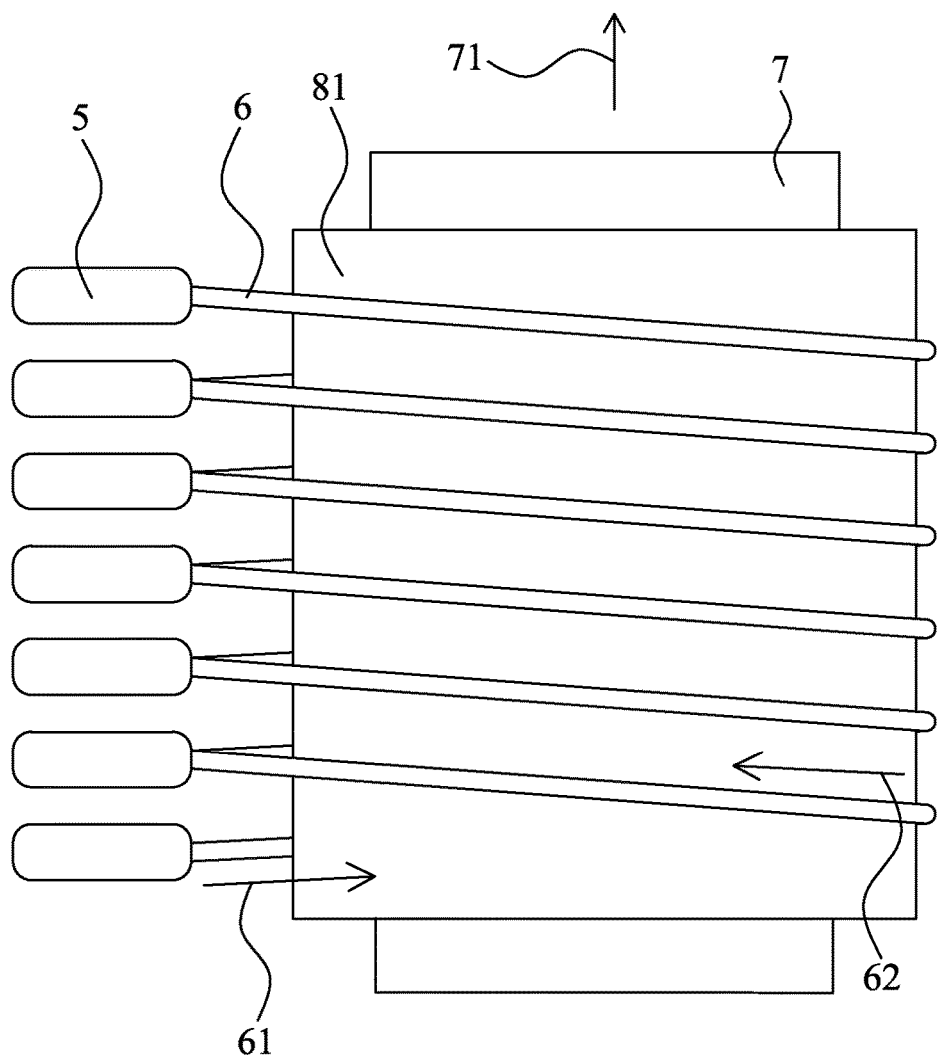
FIG. 7 is a perspective view showing the magnetic field generator for the magnetic card of the present invention forms a coil structure.

Please refer to FIGS. 6 and 7. According to the present invention, when the pads 5, wires 6 and core material member 7 have been arranged on the substrate 4 in the above-described manner, the flexible substrate 4 is bent into a U-shaped configuration, such that the pads 5 in the second zone 52 are superimposed on the pads 5 in the first zone 51 in one-to-one correspondence and the bent parts of the wires 6 are extended in a third direction 62, which is different from the first direction 61. In a preferred embodiment, the third direction 62 and the first direction 61 are in a mirroring relation.

In a first embodiment of the magnetic field generator 3 for the magnetic card of the present invention, as shown in FIG. 6, the pads 5 are manufactured to respectively have a thickness larger than that of the wires 6. Therefore, when the flexible substrate 4 is bent to bring the pads 5 located in the first and second zones 51, 52 at the same row and the same column to correspondingly connect to one another, an encircling space 41 is defined by and between the connected pads 5 and the wires 6, and the core material member 7 is located at a middle position in the encircling space 41. As can be seen in FIG. 7, the pads 5 and the wires 6 together sequentially form a helical coil structure, which cooperates with the core material member 7 to generate a magnetic field.

According to a preferred embodiment of the present invention, the wires 6 of the magnetic field generator 3 can have a solder mask layer 80 formed on their surfaces. The solder mask layer 80 can be selected from a solder mask coating or a cover layer. As shown in FIG. 6, after the substrate 4 has been bent, a top and a bottom of the core material member 7 are located adjoining to the solder mask layers 80 of the wires 6. For the core material member 7 to firmly attach to the solder mask layers 80, an adhesive material 81 can be provided between the solder mask layers 80 and the core material member 7 to adhere them to one another.

However, it is understood the solder mask layers 80 for the wires 6 are only illustrative. In other operable embodiments, the solder mask layers 80 can be omitted and the adhesive material 81 is directly applied between the wires 6 and the core material member 7, so that the wires 6 are not in direct contact with the core material member 7.

Figure 8:
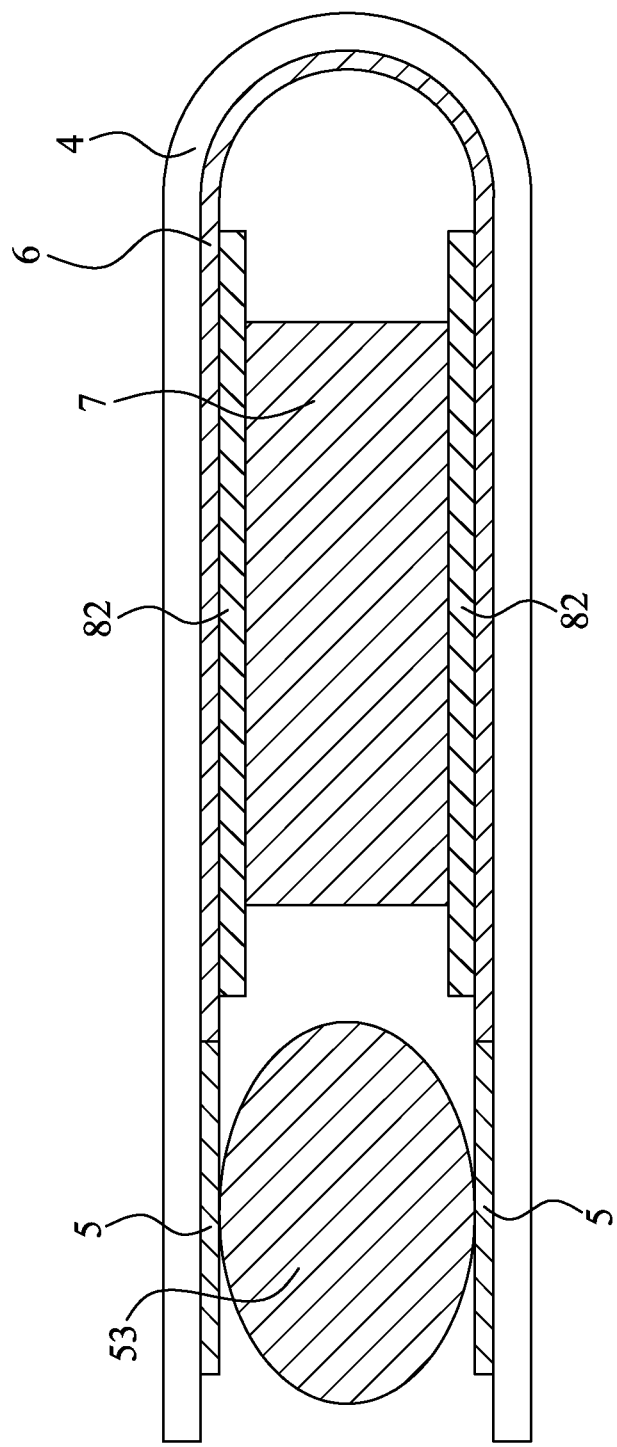
FIG. 8 is a sectional view of a second embodiment of the magnetic field generator for the magnetic card of the present invention.

On the other hand, in a second embodiment of the magnetic field generator 3 for the magnetic card of the present invention, as shown in FIG. 8, while the flexible substrate 4 and the third direction 62 generated after the wires 6 are bent along with the substrate 4 are just identical to those in the first embodiment, the second embodiment is different from the first embodiment in two aspects. First, the pads 5 in the second embodiment respectively have a thickness smaller than that of the pads 5 in the first embodiment; and second, the wires 6 in the second embodiment are not formed with the solder mask layers 80 but are spaced from the core material member 7 by an insulating material 82. That is, in the second embodiment, when the substrate 4 is flexed to a U-shaped configuration, the thinner pads 5 in the first and second zones 51, 52 are not able to directly electrically connect to one another. Therefore, a conductive material member 53 is provided between each pad 5 in the first zone 51 and its corresponding pad 5 in the second zone 52. The pads 5, the wires 6 and the conductive material members 53 together form a coil structure. The insulating material 82 can be applied to the top and the bottom of the core material member 7 or to enclose the whole core material member 7 to thereby isolate the core material member 7 from the wires 6 (not shown).

The present invention has been described with some preferred embodiments thereof and it is understood that many changes and modifications in the described embodiments can be carried out without departing from the scope and the spirit of the invention that is intended to be limited only by the appended claims.

What is claimed is:

1. A magnetic card, comprising a magnetic field generator;

the magnetic field generator being arranged inside the magnetic card and configured to generate variable magnetic field magnitude, and including:
a substrate made of a flexible material;
a plurality of pads arranged on the substrate and arrayed to form a first zone and a second zone;
at least one wire arranged on the substrate to extend in a first direction to connect at two opposite ends to two of the pads that are separately located in the first zone and the second zone; and
at least one core material member extending in a second direction, which is oblique to the first direction; and
the substrate being flexed to a bent state, such that the pads in the first zone and the pads in the second zone are connected to one another in one-to-one correspondence and the at least one core material member is located in an encircling space defined by the connected pads and the wires.

2. The magnetic card as claimed in claim 1, wherein the pads in the first zone and the pads in the second zone that are correspondingly connected to one another are in direct contact with one another.

3. The magnetic card as claimed in claim 2, wherein the pads and the wires together form a coil structure.

4. The magnetic card as claimed in claim 1, wherein the magnetic field generator further includes a conductive material member provided between each pair of the correspondingly connected pads in the first and the second zone.

5. The magnetic card as claimed in claim 4, wherein the pads, the wires and the conductive material members together form a coil structure.

6. The magnetic card as claimed in claim 1, wherein the wires respectively have a solder mask layer formed on a surface thereof.

7. The magnetic card as claimed in claim 6, wherein the magnetic field generator further includes at least one adhesive material provided between the solder mask layers and the core material member to adhere the core material member to the wires.

8. The magnetic card as claimed in claim 1, wherein the magnetic field generator further includes at least one adhesive material provided between the core material member and the wires to adhere the core material member to the wires.

9. The magnetic card as claimed in claim 1, wherein the magnetic field generator further includes at least one insulating material provided between the core material member and the wires.

10. The magnetic card as claimed in claim 1, wherein the wires are bent along with the substrate, such that a bent part of each of the wires is extended in a third direction that is different from the first direction.

* * * * *